March 20, 1934. E. PASCUCCI 1,951,946

GUIDE ROLLER

Filed Dec. 13, 1929

INVENTOR
EMILIO PASCUCCI.
BY
ATTORNEYS.

Patented Mar. 20, 1934

1,951,946

UNITED STATES PATENT OFFICE 1,951,946

GUIDE ROLLER

Emilio Pascucci, Corning, N. Y., assignor to Corning Glass Works, Corning, N. Y., a corporation of New York Application December 13, 1929, Serial No. 413,871

2 Claims. (Cl. 287—53)

This invention relates to guide rollers and a method of making them and more particularly to rollers known in the silk and "rayon" industry as "godet" rollers.

For some time past glass rollers have been used for contacting with the fibrous threads in the silk and rayon industries and have proven highly desirable as the smooth, hard and polished surface of the glass has reduced breakage of the threads and the lost time occasioned by such thread breakage. Owing to the nature of the material and its working limitations, it has been necessary to construct these rollers with relatively large draft so that as they were pressed they could be removed from the molds. This has been found objectionable due to the fact that the surface of the roller was not parallel with its longitudinal axis. Moreover, rollers of the type ordinarily employed have heretofore required complicated molds and pressing operation with the result that they are more or less expensive to produce.

The primary object of the present invention is to secure a smooth, true running surface for guiding fibrous threads.

Another object is to secure a roller whose surface will be substantially parallel to its axis.

Still another object is to simplify the pressing operations and the molds required for the production of glass rollers of the type above referred to.

The above and other objects may be accomplished by employing my invention which embodies among its features the molding of molten or plastic material under pressure into the shape of a roller having a flange on the end opposite the web.

Figure 1:
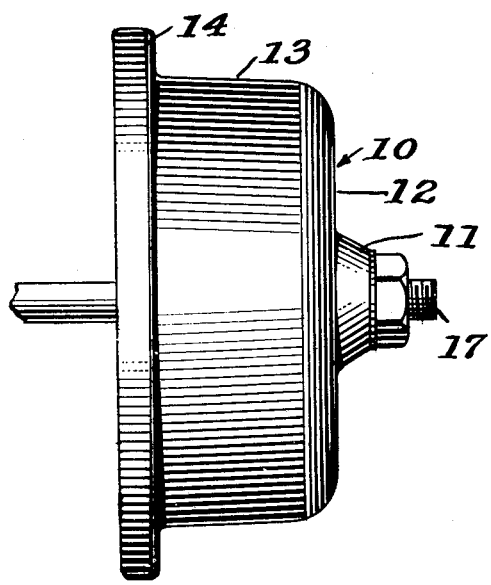
Fig. 1 is a side view of a roller constructed in accordance with this invention.
Figure 3:
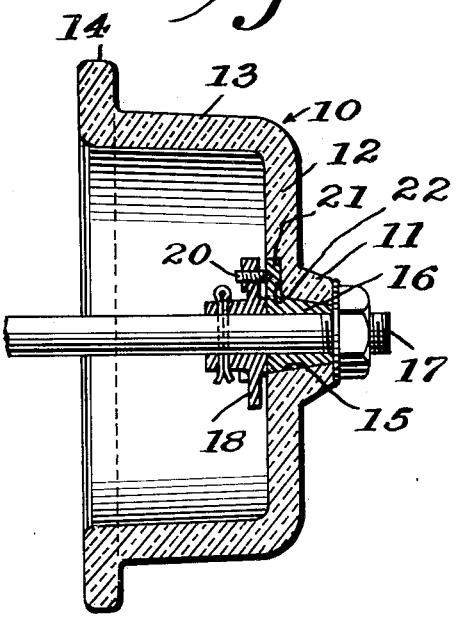
Fig. 3 is a sectional view taken on the line 3—3 of Fig. 2.
Figure 2:
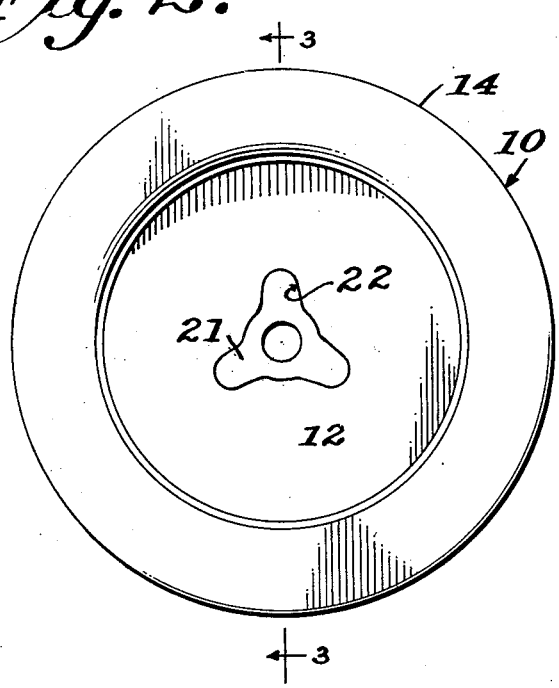
Fig. 2 is an end view of Fig. 1.
Figure 4:
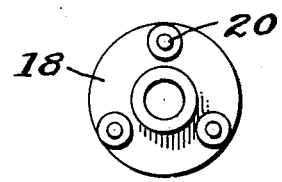
Fig. 4 is an end view of a roller drive disc.

Referring to the drawing in detail, the roller designated generally 10 is composed of a moldable material such as glass which is pressed into shape to form a hub 11, a web 12, a circular cylinder 13 and a flange 14. As illustrated in Fig. 3, the hub is pressed with a tapered bore 15 for the reception of a metal core 16 which is fitted onto the end of the drive shaft 17. A disc 18 is secured to the shaft near its end and is formed at spaced intervals with threaded bores for the reception of pointed set screws 20 which engage in the depressions with the radial arms 21 formed on the core 16 so that when the shaft is rotated the core and roller will be driven. As shown in Fig. 2, the radial arms 21 are embedded in recesses 22 formed in the inner face of the web 12.

The roller above described will readily lend itself to the methods employed in pressing glass as the outside of the roller may be pressed into what is commonly termed the mold bottom and very little draft need be allowed to facilitate the removal of the pressed article from the mold. The inside of the roller may be formed but the mold plunger and the entire molding of the article may be completed in a single operation without the production of fins or other objectional projections such as are encountered when more complicated molds are used, it being understood that the more complicated the mold employed in producing the article the more chance there is for the production of imperfections.

While in the foregoing there has been shown the preferred embodiment of my invention, it is to be understood that minor changes in the details of construction, combination, and arrangement of parts may be resorted to without departing from the spirit and scope of my invention as claimed.

I claim:

1. The combination with a roller having a centrally located bushing receiving opening, a bushing in said opening and radial arms on the bushing embedded in the roller, of a shaft having a threaded end, a spider secured to the shaft near the thread, a nut threaded on the shaft for clamping the bushing against the spider, and means carried by the spider and engaging the arms on the bushing for causing the roller to turn with the shaft.

2. The combination with a roller having a centrally located bushing receiving opening, a bushing in said opening and radial arms on the bushing embedded in the roller, of a shaft having a threaded end, a spider secured to the shaft near the threads, a nut threaded on the shaft for clamping the bushing against the spider, and pointed screws carried by the spider for engaging and entering the arms of the bushing to cause the latter to turn with the shaft and drive the roller.

EMILIO PASCUCCI.